(12) United States Patent
Epperson et al.

(10) Patent No.: US 8,799,062 B1
(45) Date of Patent: Aug. 5, 2014

(54) SYSTEM FOR IMPROVING SHAPE-BASED TARGETING BY USING INTEREST LEVEL DATA

(71) Applicant: MaxPoint Interactive, Inc., Morrisville, NC (US)

(72) Inventors: Joseph Epperson, Cary, NC (US); Kurt Carlson, Austin, TX (US); Christopher Farmer, Austin, TX (US); Mark Lowe, Morrisville, NC (US); Robert Gonzalez, Austin, TX (US)

(73) Assignee: MaxPoint Interactive, Inc., Cary, NC (US)

( * ) Notice: Subject to any disclaimer, the term of this patent is extended or adjusted under 35 U.S.C. 154(b) by 10 days.

(21) Appl. No.: 13/762,297

(22) Filed: Feb. 7, 2013

Related U.S. Application Data

(63) Continuation-in-part of application No. 12/789,731, filed on May 28, 2010.

(51) Int. Cl.
  *G06Q 30/00* (2012.01)
  *G06Q 30/02* (2012.01)

(52) U.S. Cl.
  CPC .................................. *G06Q 30/0269* (2013.01)
  USPC ........................................................ 705/14.1

(58) Field of Classification Search
  CPC ....................................................... G06Q 90/00
  USPC .......................................................... 705/14.1
  See application file for complete search history.

(56) References Cited

U.S. PATENT DOCUMENTS

| | | | |
|---|---|---|---|
| 8,296,180 B1 | 10/2012 | Epperson et al. | 705/14.1 |
| 2009/0089151 A1* | 4/2009 | Protheroe et al. | 705/10 |
| 2010/0114650 A1* | 5/2010 | Sherr et al. | 705/10 |
| 2010/0180013 A1 | 7/2010 | Shkedi | 709/219 |

OTHER PUBLICATIONS

International Search Report and Written Opinion, Application No. PCT/US2014/015386, 5 pages, Apr. 28, 2014.

\* cited by examiner

*Primary Examiner* — Daniel Lastra
(74) *Attorney, Agent, or Firm* — King & Spalding L.L.P.

(57) ABSTRACT

A system for improving shape-based targeting by using interest level data is disclosed. According to one embodiment, a computer-implemented method includes creating one or more trade zones, wherein creating a trade zone includes grouping a set of parameters to deliver custom shapes, clustering the custom shapes according to offline data and geographic distribution of IP addresses, and mapping clusters of the custom shapes to IP addresses. Data indicating consumption of a content source is received by one or more trade zones at a calculated rate and the calculated rate is analyzed to determine an interest associated with each trade zone. Targeting is based on a selected trade zone, wherein the selected trade zone is selected based upon a desired interest representative of a desired audience. A targeting request is transmitted including instructions or information associated with a target action, and the target action is performed.

65 Claims, 11 Drawing Sheets

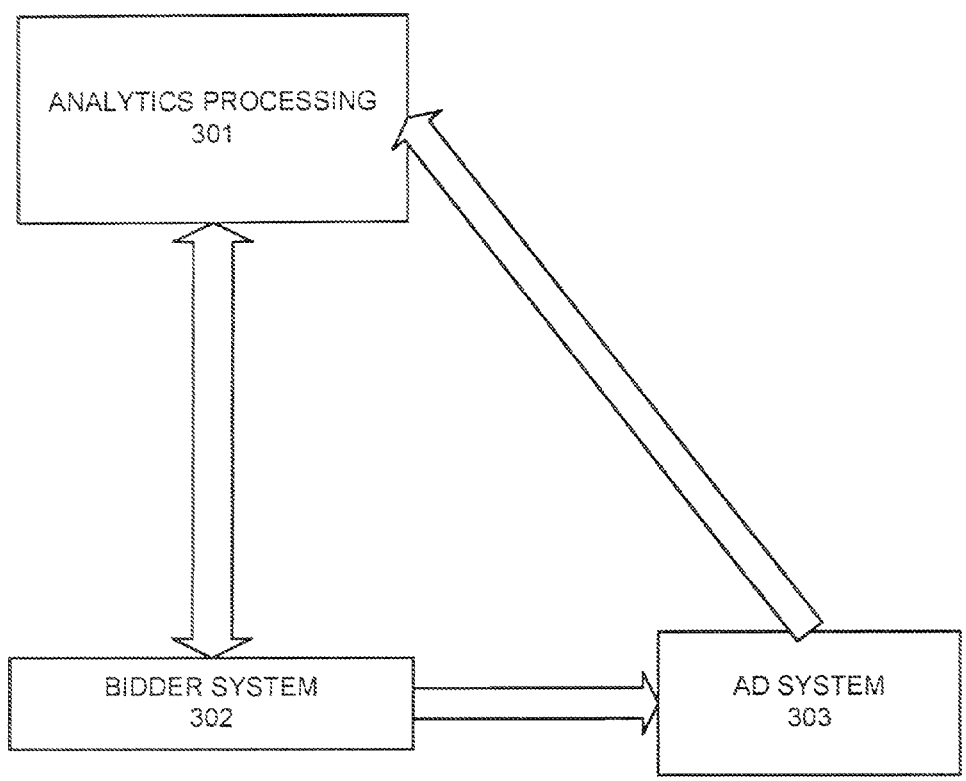

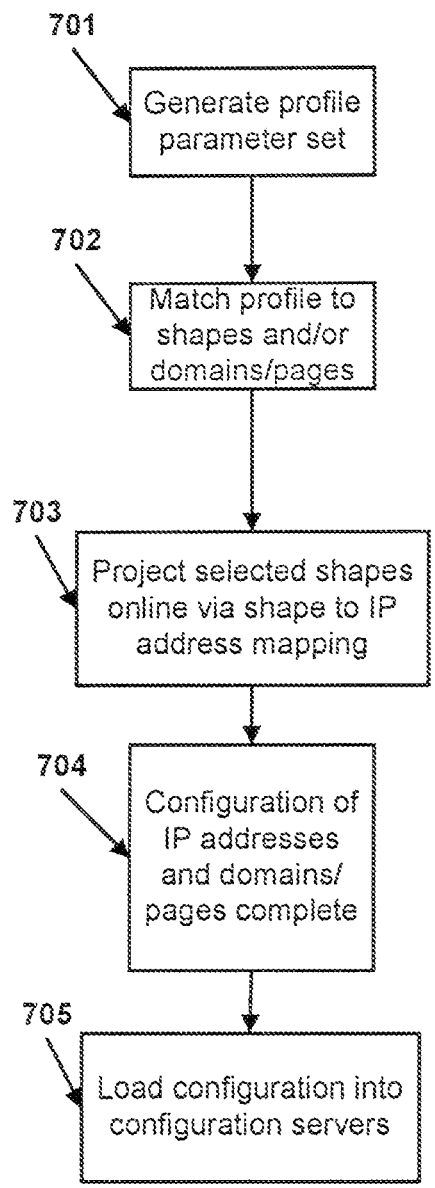

SYSTEM FOR IMPROVING SHAPE-BASED TARGETING BY USING INTEREST LEVEL DATA

CROSS REFERENCE TO RELATED APPLICATIONS

The present application is a continuation-in-part of U.S. patent application Ser. No. 12/789,731, entitled "SYSTEM FOR HANDLING MULTIPLE SIMULTANEOUS CAMPAIGNS THAT IMPROVES ADVERTISEMENT PERFORMANCE THROUGH SHAPE BASED TARGETING AND REAL-TIME IMPRESSION ACQUISITION," filed on May 28, 2010, the disclosure of which is hereby incorporated by reference in its entirety.

FIELD

The field of the invention relates generally to computer systems. In particular, the present invention is directed to a system for improving shape-based targeting by using interest level data.

BACKGROUND

Ad serving describes the technology and service that places advertisements on web sites. Ad serving technology companies provide software and/or services to web sites and advertisers to serve ads, count them, choose the ads that will make the website the most money or the advertiser the best return, and monitor progress of different advertising campaigns.

Ad servers come in two flavors: local ad servers and third-party or remote ad servers. Local ad servers are typically run by a single publisher and serve ads to that publisher's domains, allowing fine-grained creative, formatting, and content control by that publisher. Remote ad servers can serve ads across domains owned by multiple publishers. They deliver the ads from one central source so that advertisers and publishers can track the distribution of their online advertisements, and have one location for controlling the rotation and distribution of their advertisements across the web.

Behavioral targeting is currently implemented in the art by using cookies to track the pages that a browser visits on the Internet and using this information to place the browser user into defined segments. These segment assignments are then used to target ads to that browser. This requires that the browser has a cookie and has been seen online before the ad call is made. Since the browser has to be seen online at some point before the ad request, behavioral targeting is limited by the number of sites that participate in the page tracking.

Contextual targeting is currently implemented in the art by passing keywords to the ad server indicating the topic of the page the ad is to display on. in some cases the ad server system may have analyzed the page content beforehand and assigned it keywords based on that analysis. The ad server uses this information to select an ad that contains matching keywords. This requires that each ad placement is setup with keywords and that each ad has keywords that will match. Contextual targeting is limited because it is targeting based on a single page's context. Contextual targeting is not able to select its audience using parameters beyond general content and page keywords of the current page.

SUMMARY

A system for improving shape-based targeting by using interest level data is disclosed. According to one embodiment, a computer-implemented method comprises creating one or more trade zones, wherein creating a trade zone comprises grouping a set of parameters to deliver custom shapes, clustering the custom shapes according to offline data and geographic distribution of IP addresses, and mapping clusters of the custom shapes to IP addresses. Data indicating consumption of a content source is received, the content source having a plurality of tokens. The plurality of tokens is organized according to the one or more trade zones, wherein the one or more trade zones consume the tokens at a calculated rate and the calculated rate is analyzed to determine an interest associated with each trade zone. Targeting is based on a selected trade zone, wherein the selected trade zone is selected based upon a desired interest representative of a desired audience. A targeting request is transmitted including instructions or information associated with the target action, and the target action is performed.

The above and other preferred features, including various novel details of implementation and combination of elements, will now be more particularly described with reference to the accompanying drawings and pointed out in the claims. It will be understood that the particular methods and implementations described herein are shown by way of illustration only and not as limitations. As will be understood by those skilled in the art, the principles and features described herein may be employed in various and numerous embodiments without departing from the scope of the invention.

BRIEF DESCRIPTION

The accompanying drawings, which are included as part of the present specification, illustrate the presently preferred embodiment and together with the general description given above and the detailed description of the preferred embodiment given below serve to explain and teach the principles of the present invention.

FIG. 3 illustrates an exemplary provider system layout for use with the present system, according to one embodiment;

FIG. 7 illustrates an exemplary configuration process for use with the present system, according to one embodiment;

DETAILED DESCRIPTION

Figure 1:
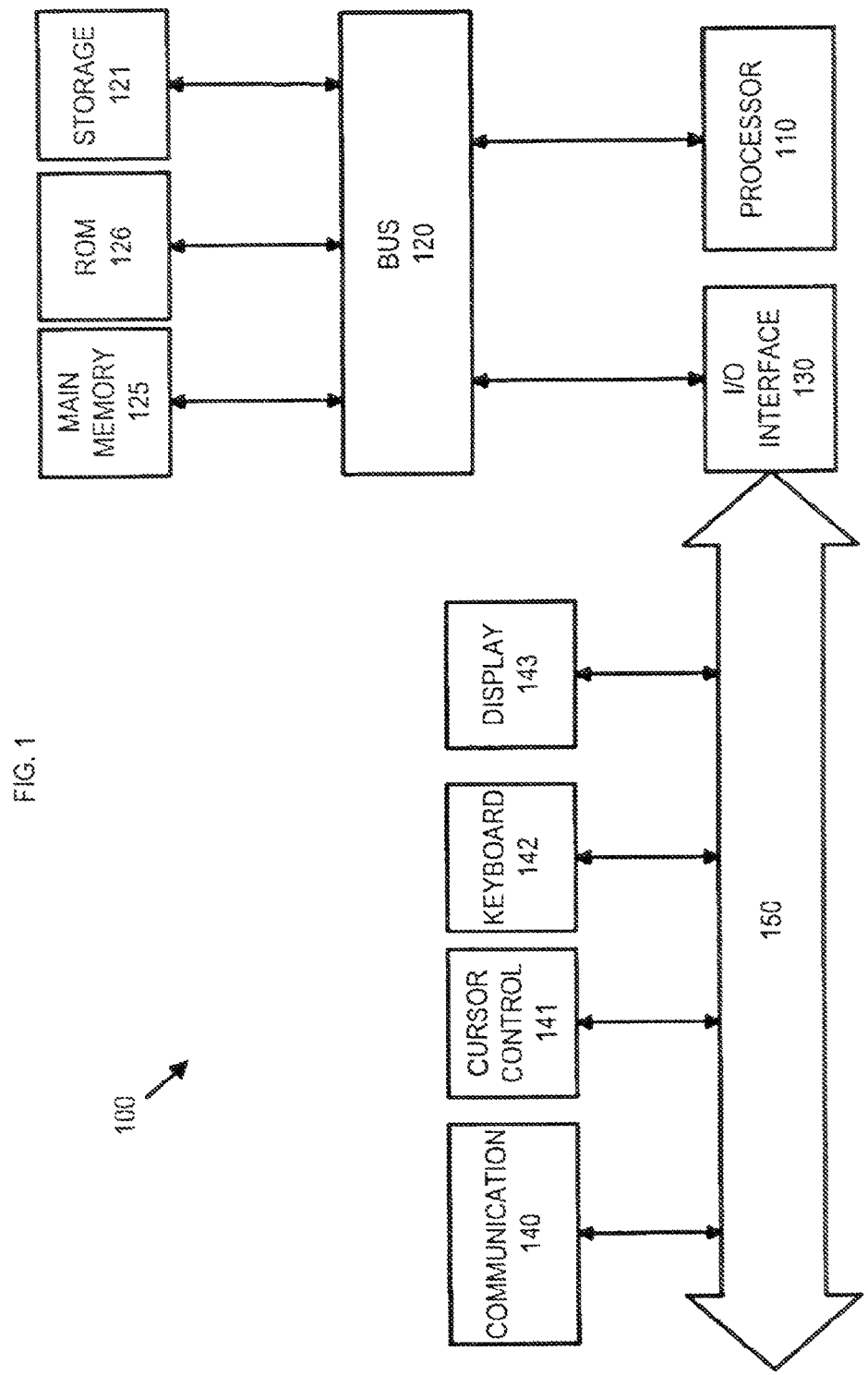
FIG. 1 illustrates an exemplary computer architecture for use with the present system, according to one embodiment.

A system for improving shape-based targeting by using interest level data is disclosed. According to one embodiment, a computer-implemented method comprises creating one or more trade zones, wherein creating a trade zone comprises grouping a set of parameters to deliver custom shapes, clustering the custom shapes according to offline data and geographic distribution of IP addresses, and mapping clusters of the custom shapes to IP addresses. Data indicating consumption of a content source is received, the content source having a plurality of tokens. The plurality of tokens is organized according to the one or more trade zones, wherein the one or more trade zones consume the tokens at a calculated rate and the calculated rate is analyzed to determine an interest associated with each trade zone. Targeting is based on a selected trade zone, wherein the selected trade zone is selected based upon a desired interest representative of a desired audience. A targeting request is transmitted including instructions or information associated with the target action, and the target action is performed.

According to one embodiment, a user interface (UI) is provided to allow for easy use of the present system. The UI includes mechanical serving setup for ad campaigns or other target actions as well as targeting parameters for internal and external users.

Targeting, according to one embodiment of the present system, uses a shape projection into the Internet. Custom defined shapes (e.g., trade zones) have associated data sets that indicate various characteristics about the audiences in those shapes. Requests are targeted to audiences based on these characteristics. Unlike prior art systems, the user does not have to be seen before and page keywords are not required to target. This allows the present system to target users who have not been seen online before the targeting request and still have an audience match for the request based on one or more of the applied data sets.

According to one embodiment, the present system bridges online and offline data by mapping all the data to custom defined (trade zone) shapes. For online data the mapping uses the IP address to map to a trade zone shape. For offline data the mapping uses location information in the offline data set to map to a trade zone shape. Examples of online data include but are not limited to clicks, impressions, and pages visited. Examples of offline data include but are not limited to demographic data, point of sale data, and business information data.

The present system collects data about the types of content that are consumed and aggregates that data to discern specific, elevated levels of interests that online audiences share. The present system also organizes interest level data into custom developed geographic "trade zones," so that the data can be used to determine which audience groupings possess sufficient interest levels for a request to target to that trade zone.

The present system enables target actions to reach relevant audiences that connect with their interests, and in so doing achieves accurate, granular, timely delivery of targeted actions. Because the data is organized into custom trade zones, a browser does not need to have been seen in order to be targeted, which addresses the volume challenge of online targeting.

The present system collects data, and analyzes it very quickly to identify emerging interest trends or bursts of interest that would otherwise not be picked up by traditional market research methods in way that would be timely (to identify emerging trends quickly) or effective (if the interest has a short cycle). According to one embodiment, consumer interests are determined in a way that does not rely on demographic analysis, behavioral targeting, or contextual targeting. The method does not require cookies, or any other form of one-to-one marketing that has raised concerns about online privacy. The present system, according to one embodiment, determines the topics of interest, and levels of interest in those topics, for audiences (rather than individuals). The audiences are defined by custom trade zones.

The present interest level method of targeting is more accurate than demographic profiling because the method involves working directly with interest data, and the ensuing responsiveness of audiences to relevant messaging, rather than drawing inferences about interests from demographic data.

The present interest level targeting has advantages over contextual targeting in that contextual targeting is static and presumes an interest based on a single point of contact between a viewer and content at a point in time. The present interest level targeting involves much deeper data sets which depict comparative levels of interest. The interest level data leverages both multiple contact points between an audience and content, and the trend lines over periods of time. As a result, targeting does not have to be connected to specific content to reach the right viewers, which opens the possibility (and can reduce the cost) of acquiring media to reach the right audiences.

Behavioral targeting relies on tracking individual web consumption that limits targeting to viewers who have left a data trail online—and who have not deleted the cookies from their computers. An inherent disadvantage is that retargeting volume is limited to a subset of online viewers, and the value of cookies can be diluted as they may be brokered and resold several times to competing advertisers. The present interest level targeting can be used to reach entire audiences, without being limited to subsets of those audiences.

Some portions of the detailed descriptions that follow are presented in terms of algorithms and symbolic representations of operations on data bits within a computer memory. These algorithmic descriptions and representations are the mechanisms used by those skilled in the data processing arts to most effectively convey the substance of their work to others skilled in the art. A method is here, and generally, conceived to be a self-consistent process leading to a desired result. The process involves physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present method and system also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the method and system as described herein.

FIG. 1 illustrates an exemplary computer architecture for use with the present system, according to one embodiment. One embodiment of architecture 100 comprises a system bus 120 for communicating information, and a processor 110 coupled to bus 120 for processing information. Architecture 100 further comprises a random access memory (RAM) or other dynamic storage device 125 (referred to herein as main memory), coupled to bus 120 for storing information and instructions to be executed by processor 110. Main memory 125 also may be used for storing temporary variables or other intermediate information during execution of instructions by processor 110. Architecture 100 also may include a read only memory (ROM) and/or other static storage device 126 coupled to bus 120 for storing static information and instructions used by processor 110.

A data storage device 125 such as a magnetic disk or optical disc and its corresponding drive may also be coupled to computer system 100 for storing information and instructions. Architecture 100 can also be coupled to a second I/O bus 150 via an I/O interface 130. A plurality of I/O devices may be coupled to I/O bus 150, including a display device 143, an input device (e.g., an alphanumeric input device 142 and/or a cursor control device 141).

The communication device 140 allows for access to other computers (servers or clients) via a network. The communication device 140 may comprise one or more modems, network interface cards, wireless network interfaces or other well known interface devices, such as those used for coupling to Ethernet, token ring, or other types of networks.

Figure 2A:
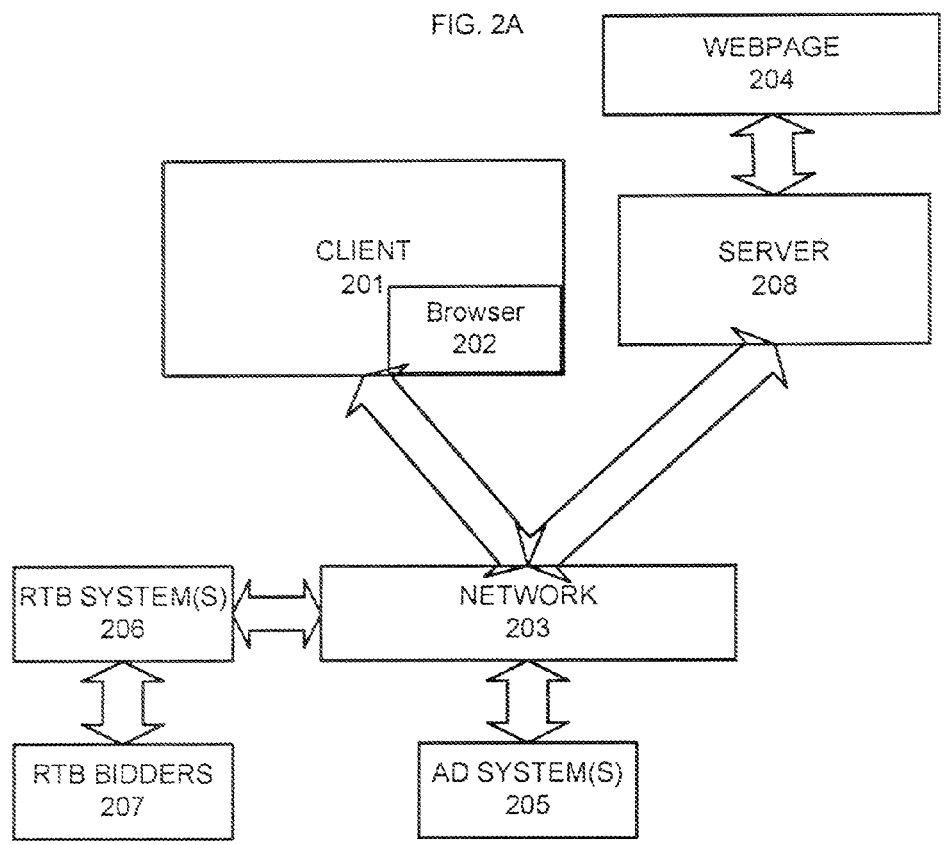
FIG. 2A illustrates an exemplary system level architecture for use with the present system, according to one embodiment.

FIG. 2A illustrates an exemplary system level architecture for use with the present system, according to one embodiment. A client device 201 having a browser 202 can view a webpage 204 hosted by a server 208. The server 208 is in communication with a network 203, the client 201 is in communication with the network, and one or more ad systems 205 are in communication with the network 203. The client device 201 can communicate with an RTB (real-time bidding) system 206, and the RTB system (or systems) 206 are in communication with the network. The RTB system (or systems) 206 is in communication with one or more RTB bidders 207.

Figure 2B:
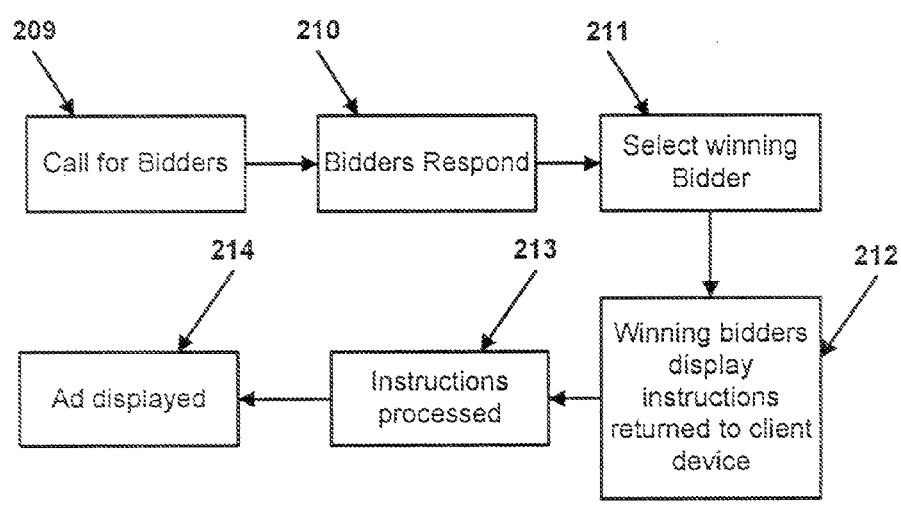
FIG. 2B illustrates an exemplary auction process for use with the present system.

FIG. 2B illustrates an exemplary auction process for use with the present system. An RTB system calls one or more RTB bidders 209 to hold an auction for each advertisement impression. Bidders respond 210 within a set period of time, for example 10-100 ms depending on the system and network latency between the servers. A bidder is selected 211. According to one embodiment, the highest, and usually the fastest, bidder wins the auction. The winning bidder's display instructions are returned to the client device 212 and processed 213 to display an ad 214. As an example, the display is rendered by returning HTML or JavaScript that calls to an ad system(s) to render the final display. Multiple ad systems may be called with the final ad system displaying the ad. The ad system tracks metrics about the ad and performance, according to one embodiment.

FIG. 3 illustrates an exemplary provider system layout for use with the present system, according to one embodiment. An analytics processing system 301 runs any number of algorithms using data from a bidder system 302 and/or ad system 303 and/or data sets associated by (trade zone) shapes. The output of the algorithms are configurations that are loaded into the bidder system 302 and ad system 303 to execute when performing bidding and ad decision processing. The ad system 303 can provide further refinement of campaign selection and/or serve the ad. The ad server may defer to another ad server to display the ad after the decision is made if needed. Ad metrics are tracked by these systems, according to one embodiment. Examples of ad metrics include but are not limited to impressions delivered, clicks, and price per impression.

According to one embodiment, configurations are constructed by the analytics processing system 301. During construction of the configuration for one or more campaigns, all data sets and the IP address space are mapped to custom defined geographic shapes. These shapes are not confined to any external pre-existing geographic shapes and can therefore be constructed to best meet the system needs and/or campaign performance optimization. According to one embodiment, areas are analyzed on one or more sets of data parameters and similar areas are combined into a shape. Trade zones are constructed from smaller shapes that are too small to realistically represent an IP range mapping due to the nature of IP distribution. When aggregating smaller shapes to construct the trade zones, consideration includes but is not limited to the geographic areas that best conform to the probable distribution of the IP address ranges, the demographic homogeneity of the individual shapes that are aggregated to form the trade zone, natural geographic boundaries that can create segmentations for targeting, types of IP address ranges including, by way of example, business, residential, or public location assigned to the IP addresses, and any other factors that can be used to identify similarities between the individual shapes. Combining the smaller shapes into larger shapes creates a targeting shape. This delivers a more realistic view of both the areas reached by the assigned IP addresses and the probable audience within the constructed shape.

One example of trade zone construction is to use census tracts or block groups as the "building blocks" to create the trade zone shapes. Using IP location data, in combination with but not limited to business location data, IP ranges can be mapped into one of the smaller shapes or a primary shape. The surrounding shapes without direct IP mappings are assigned to this primary shape using both proximity factors and other data sets (such as demographic data encompassing income, education level). Assigning the other shapes to the primary shape creates the groupings of individual shapes that become the trade zone shape. Multiple data sets may be used to create decision criteria for grouping the shapes. The shapes are contiguous to accurately capture the possible distribution of the IP addresses. Once the trade zone shapes are constructed, IP mappings can be updated frequently when new IP, business location and/or other data sets become available.

An unlimited number of datasets can be mapped into the shapes using spatial relationships to establish an unlimited number of distinguishing characteristics about the shapes. The shapes also have a mapping to IP ranges that allow targeting to be executed by the targeting systems such as but not limited to publisher, bidding and ad targeting systems. Some or all of the datasets can be used in the algorithms that produce targeting configurations. Each new dataset provides another set of parameters that can be used in determining a configuration.

The custom groupings and shapes are more effective than commonly used external static definitions of geographic areas because they are not tied to any one data set's definition and can be constructed to better approximate true online groupings based on shared characteristics such as demographic profile, IP address distribution or consumption patterns. They can also be changed and/or updated as needed. These shapes allow for an unlimited number of data sets to be added to a shape mapping and used in combination. Datasets can be added to the system at anytime.

According to one embodiment, the shape-based IP mappings are enhanced based on other dimensions. These additional dimensions are added on top of a base mapping that already incorporates shapes. An example of an additional dimension is type of IP address. Examples of types of IP addresses include but are not limited to business, residential, and public.

According to one embodiment, the final output is a data profile of the desired audience. The data profile is mapped to the shapes which are then mapped to IP groups such that when there is a potential match with an IP address in the configuration, the targeting systems such as but not limited to publisher, bidding and ad targeting systems can target the request.

According to one embodiment, the system finds impression matches that are a good fit by projecting across the data sets to shapes that have similar profiles for the data sets or parameters being used. This applied decision criteria is independent of specific geography. As an example, a data set may identify a shape in Ames, Iowa that has a similar profile to a shape in a Santa Fe, NM over the same parameter set, so both of the shapes and thus their IP ranges can be included in the configuration for targeting. As another example, during an ad campaign trade zones that are determined to be responsive to a particular advertising message can then be compared to other trade zones that contain similar combinations of characteristics. These similar or "look-alike" trade zones can then also be targeted by the ad campaign.

According to one embodiment, the present matching process allows targeting systems decisions on individual requests to be made based on whether or not the operator of a browser—in a probabilistic sense—is likely to share the characteristics of the desired audience profile. Using a probabilistic approach enables configurations for targeting that encompass a wider range of audience than traditional systems have. Decisions are made on requests that look enough like the desired data profile, rather than definitively belonging to a specific data set (i.e. a cookie-based decision). This look-alike method allows the system to target requests in volumes that can support campaigns and still maintain performance by focusing the targeting on the desired audience.

According to one embodiment, additional filtering is based on contextual information, in addition to the basic profile information. For example, an IP address may map to the desired profile, but the impression on a publisher site, or page within a publisher site, that is not desired for a specific target item.

According to one embodiment, the present system improves advertisement (herein referred to as "ad") performance through a shape-based targeting system that acquires pre-targeted impressions and handles multiple simultaneous campaigns. The present system matches, bids on, and acquires ad impressions on an individual basis and in real-time, using a shape based targeting system. Therefore the present system enables ad campaigns to achieve improved performance by selectively acquiring impressions that, in a probabilistic sense, will reach only the desired audience for a specific campaign. Since the impression is pre-targeted to at least one campaign, wasted impressions are minimized. Improved performance is achieved without having to collect, analyze, and base targeting criteria on individual online user habits. An individual online user does not have to have been "seen" by the present system in order for the system to be effective in determining whether or not to target that user.

According to one embodiment, bid price is determined by the highest remaining campaign price after all filtering is completed. The price a campaign will pay is determined per campaign per page along with other characteristics of the impression such as size or placement on the page. If multiple campaigns overlap, or can be shown to a single impression, the bidders and/or ad systems can select the final campaign for the impression by using a selection algorithm to complete the selection. Examples of selection algorithms include but are not limited to weighted, random, and sequential. The ad serving system can also use the winning price as an input to its algorithm. In this way, multiple campaigns can be run on the bidding/ad server platforms simultaneously.

Figure 4:
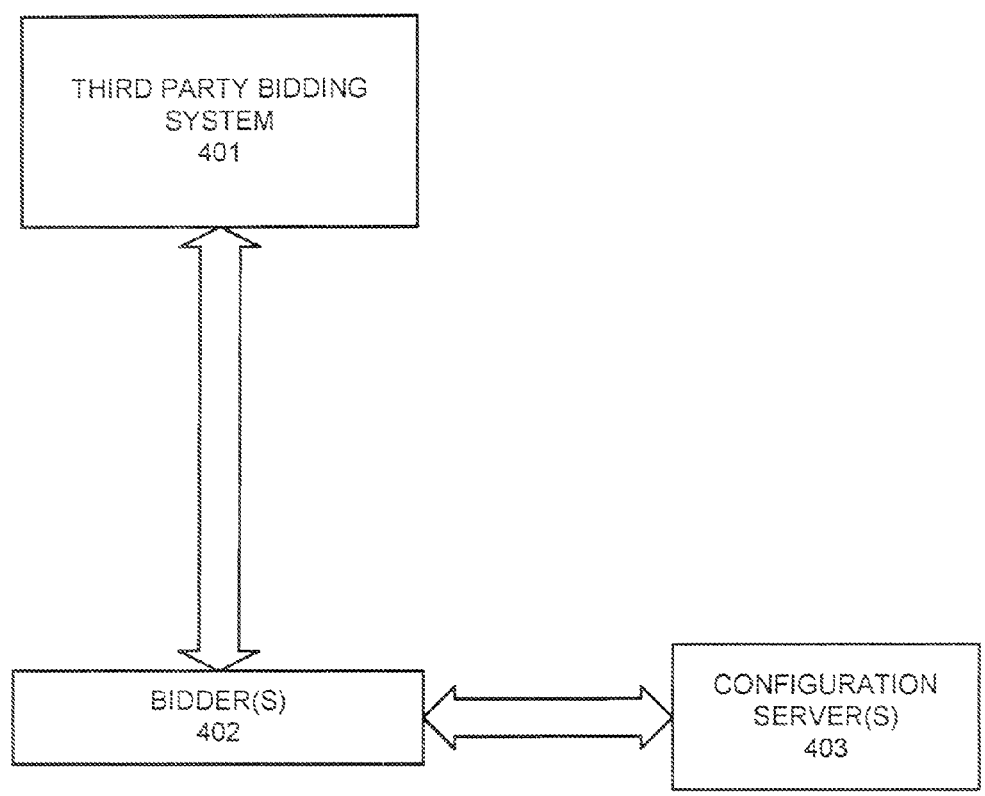
FIG. 4 illustrates an exemplary real-time bidding (RTB) bidder system for use with the present system, according to one embodiment.

FIG. 4 illustrates an exemplary real-time bidding (RTB) bidder system for use with the present system, according to one embodiment. A third party bidding system 401 is in communication with a bidder 402, and the bidder 402 is in communication with a configuration server 403. It is noted that a bidding system 401 can be in communication with multiple bidders 402, and a bidder 402 can be in communication with multiple configuration servers 403. A third party bidding system 401 is also referred to as an "advertising exchange." Third party bidding systems 401 offer to sell impressions for publishers by enlisting provider companies to implement bidders 402 to bid on impression requests on their systems. A configuration server 403, according to one embodiment, is a system that contains configuration information about campaigns to be used by the bidders 402 for impression purchase decisions. To make lookups over large amounts of data (millions of rows per campaign) faster, the configuration servers 403 keep all of the configurations loaded in memory, organized in a way to provide optimal lookup. As an example, a database such as MySQL can be configured to keep all the tables in memory. As another example, a custom cache server can be written to keep all of the data in memory in a manner that is optimized for fast lookups. According to one embodiment, multiple configuration servers 403 that either duplicate and/or partition the data by campaign exist.

Figure 5:
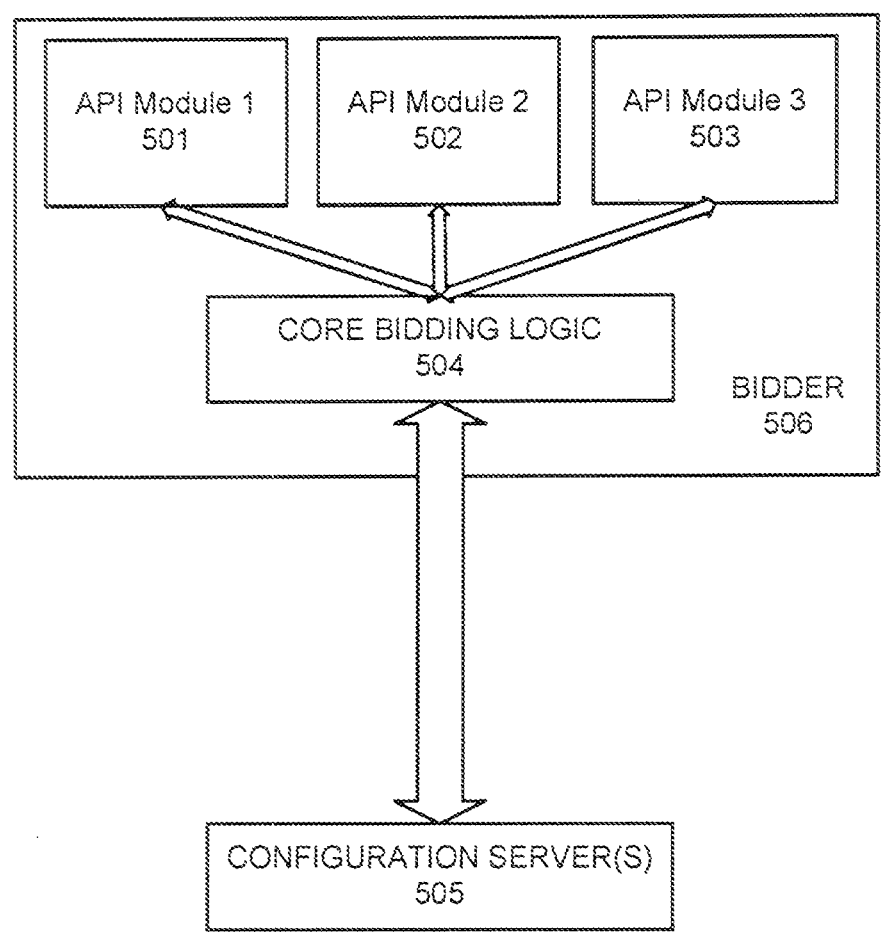
FIG. 5 illustrates an exemplary bidder for use with the present system, according to one embodiment.

FIG. 5 illustrates an exemplary bidder for use with the present system, according to one embodiment. A bidder 506 is in communication with one or more configuration servers 505. A bidder 506 processes requests to bid on impressions from a third party bidding system 401 to determine if it should bid on the impression based on its current configurations for running campaigns. Bidders 506 support multiple bidding API's because of the API module layer. A bidder has multiple API modules 501, 502, 503 in the API module layer. The API module layer is able to translate a request from a specific API into a software structure that the core system can use, and then translate the response back into the specific API format. To support a new bidding API, only a new API Module needs to be added to the bidder 506.

The bidder 506 uses core bidding logic 504 for bidder processing. During bidder 506 processing, a bid request is sent to the bidder 506. The bidder 506 filters it against mechanical constraints, including but not limited to size, creative type, and allowed destinations. The bidder 506 filters remaining ads against current configurations. Finally, a bid is executed if the result set of this second filter is not empty.

Figure 6:
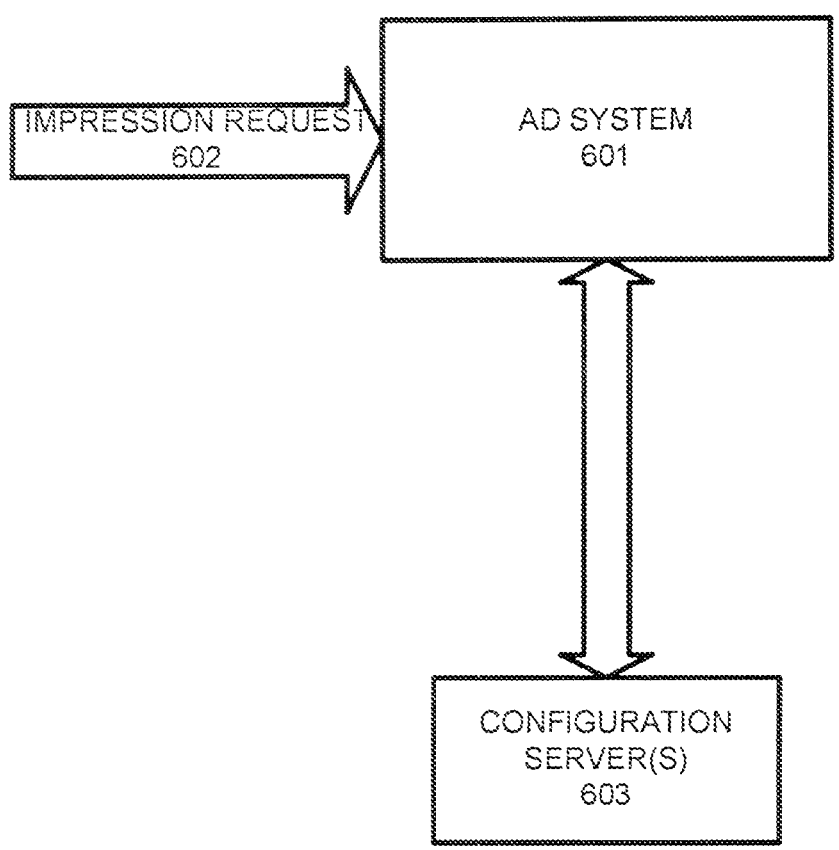
FIG. 6 illustrates an exemplary advertisement decision system for use with the present system, according to one embodiment.

FIG. 6 illustrates an exemplary advertisement system for use with the present system, according to one embodiment. According to one embodiment, an ad system can work independently or in conjunction with the RTB systems. The ad system uses the campaign configuration information to target and select a campaign ad to display to fill an impression request 602. An ad system 601 is in communication with one or more configuration servers 603. A request to fill an impression 602 is received by the ad system 601. The ad system 601 filters campaigns by mechanical constraints, examples include but are not limited to size and browser. The ad system 601 filters remaining ads against current campaign configurations. An ad is selected from the result set, and the ad is served to a client by an ad server that contains the ad.

FIG. 7 illustrates an exemplary configuration process for use with the present system, according to one embodiment. A profile parameter set is generated 701 via manual or automated mechanisms. Manual mechanisms can include selection by a customer, and automated mechanisms can include feedback based mechanisms. The profile parameter set is used to match the profile to shapes (trade zones) and/or domains/pages 702. The selected shapes (trade zones) are projected online via shape to an IP address mapping 703. The selected domains/pages create a rule that is added to the configuration. The configuration of IP addresses and domains/pages is complete 704 and the configuration targets the desired audience for a targeting item. The configuration is loaded into configuration servers 705 for targeting systems to use for targeting. An example of matching profile to shapes 702 is illustrated below in FIG. 9B.

Figure 8A:
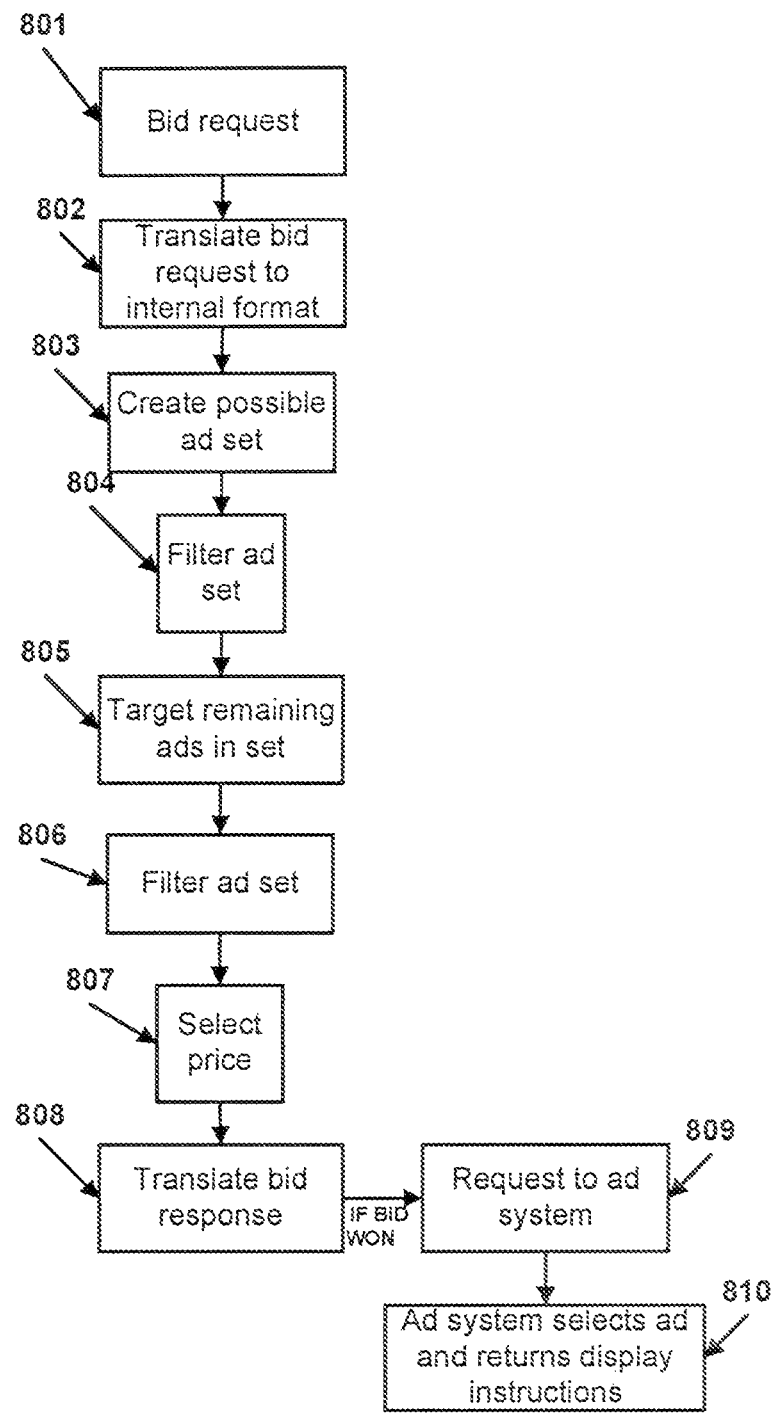
FIG. 8A illustrates an exemplary bidding process for use with the present system, according to one embodiment.

FIG. 8A illustrates an exemplary bidding process for use with the present system, according to one embodiment. A bid request is received 801 and the bid request is translated from API specific to an internal format 802. A possible ad set is created 803 and the ad set is filtered against the bid request 804. The filtering of the ad set is performed using mechanical constraints such as size, creative, type, and allowed sites, according to one embodiment. The remaining ads in the set are targeted 805 using the IP address and configuration servers. The ad set is filtered using targeting information 806. Price is selected 807 from remaining ads in the set and a bid is made (if empty set, pass). The bid response is translated from internal format to API specific format 808, and the request is directed to the ad system 809 upon winning the bid. The ad system selects the final ad and returns display instructions for the ad to the client 810.

Figure 8B:
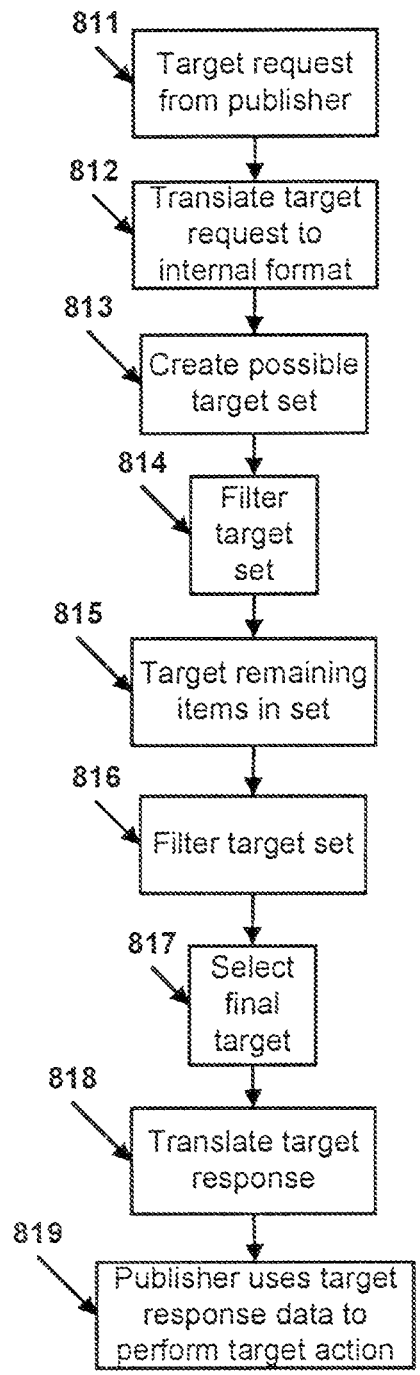
FIG. 8B illustrates an exemplary publisher targeting process for use with the present system, according to one embodiment.

FIG. 8B illustrates an exemplary publisher targeting process for use with the present system, according to one embodiment. A website publisher sends a targeting request 811 and the request is translated from a publisher specific format to an internal format 812. A possible target set is created 813 and the set can be filtered against the target request parameters 814. The filtering of the target set is performed using mechanical constraints such as size, creative types, or other constraints imposed by the publisher, according to one embodiment. The remaining target items in the set are targeted 815 using the IP address and configuration servers which contain targeting configurations. The set is filtered using targeting information 816. The final target is selected 817 and the corresponding publisher specific targeting information is translated from an internal format to the publisher specific format 818. The request is returned to the publisher and the publisher uses the targeting response data to perform a target action 819. Items on a publisher web page that are targeted include but are not limited to content display, ads to display, and coupons to display.

According to one embodiment, when there is a match with multiple target items to a trade zone, the best fit target item is selected by giving priority to fit with high interest levels and balancing the distributed requests across all target items that have a fit.

According to one embodiment, a targeting configuration is developed for each targeting item (such as but not limited to an ad campaign, bidder item, ad selection, publisher target action) to integrate the item into the targeting systems. The configuration is used to identify the requests that will be targeted to the selected custom trade zones. The targeting systems evaluate each individual request to determine whether there is a fit with any target items in the decision set. Response data is evaluated during the lifetime of the targeting item (examples of response data include but are not limited to click-through rates, coupon downloads, impressions delivered, price per impression, lead submissions, landing page arrivals, product queries, and product purchases) to refine the targeting criteria.

Figure 9A:
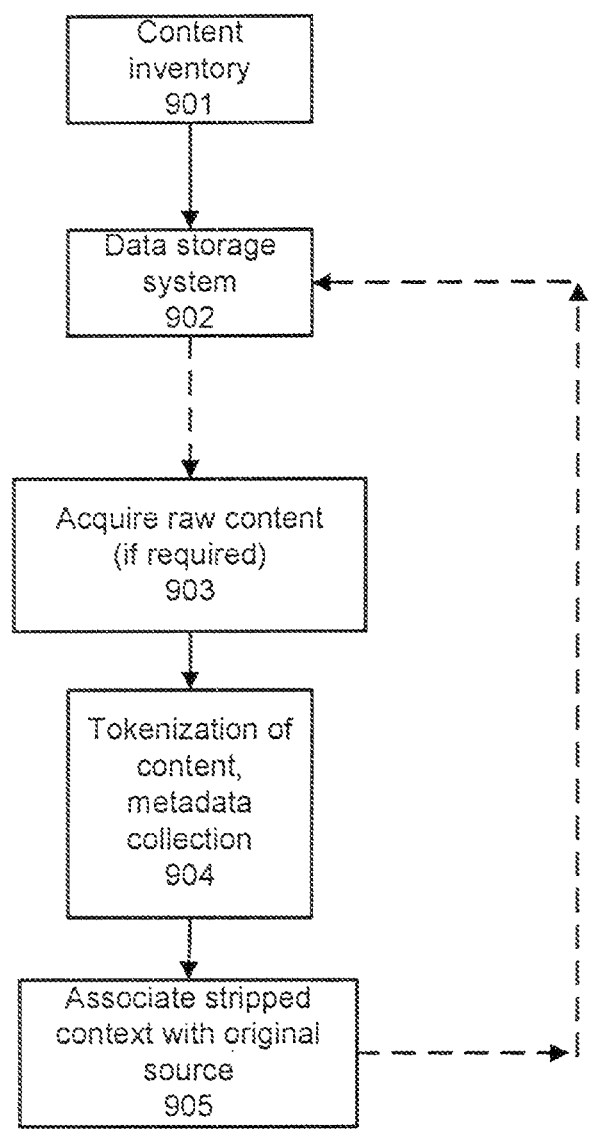
FIG. 9A illustrates an exemplary trade zone level interest determination process for use with the present system, according to one embodiment.

FIG. 9A illustrates an exemplary trade zone level interest determination process for use with the present system, according to one embodiment. Content consumed by users in a trade zone across time is collected in several ways. One embodiment creates an inventory of consumed content from several sources 901. Example inventory or content sources include yet are not limited to web pages from websites providing data feeds, web pages associated with target requests, purchased website server logs, mobile applications, television programming transcripts (and other video sources), and on-demand video selections. In one embodiment, this content is stored 902 allowing for further uses without impeding the real-time content collection. As an example, web pages from a website providing a page visit data feed via pixel image requests 901 are stored 902 and have associated raw content 903 collected. Once raw content is collected, it is tokenized 904 while preserving contextual metadata. Contextual metadata changes depending on the content source. For example, web page token location and formatting characteristics can be preserved. Video transcript metadata can include demographic information about the speaker or scene descriptions, for example. The stripped content (e.g. tokens) is associated with original source data 905 and stored in the data storage system 902. Tokenization occurs at the word, word pair, phrase or other level, for example.

Figure 9B:
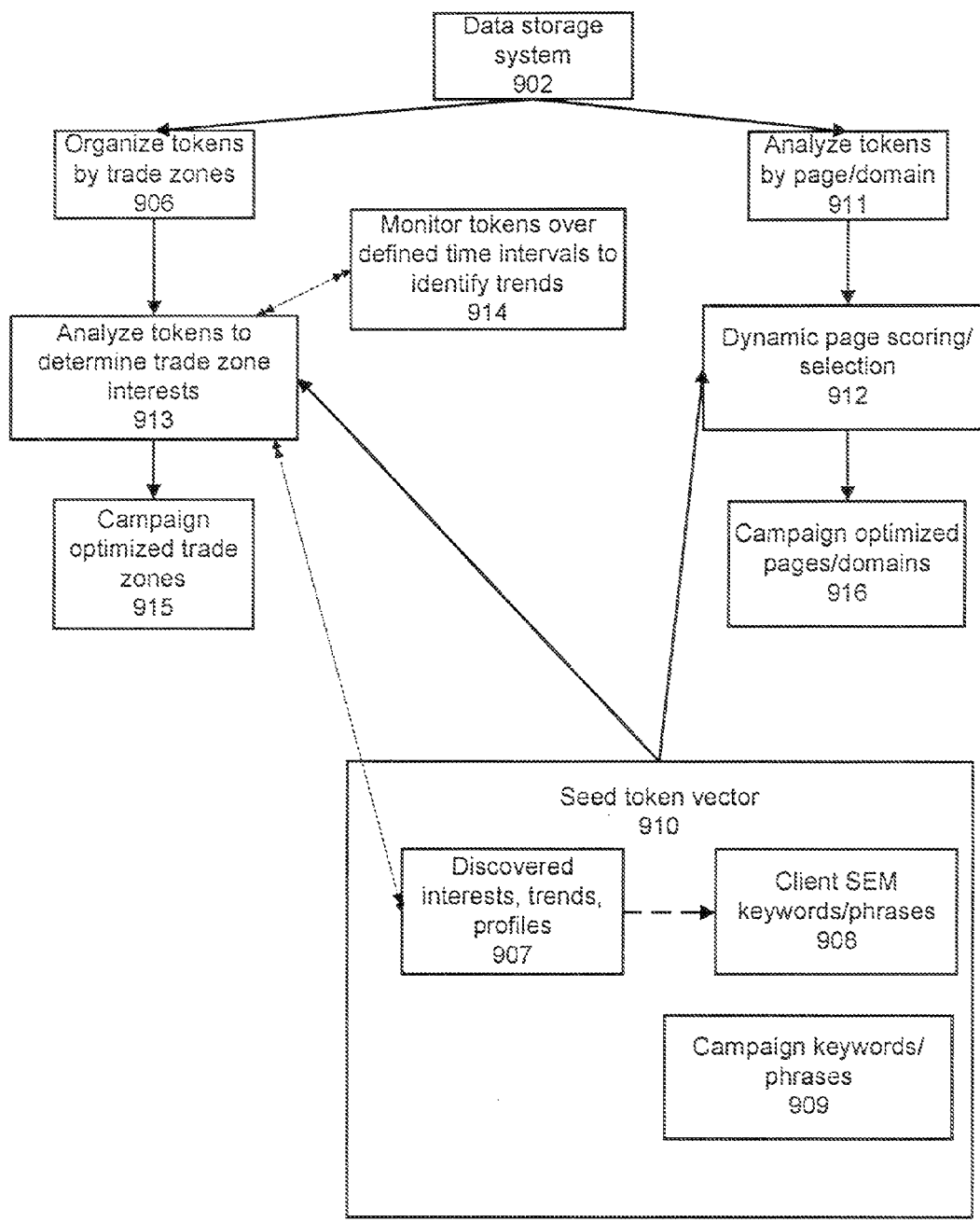
FIG. 9B illustrates an exemplary trade zone level interest determination process for use with the present system, according to one embodiment.

FIG. 9B illustrates an exemplary trade zone level interest determination process for use with the present system, according to one embodiment. In one embodiment, statistics are collected for the token of choice and aggregated at the trade zone level 906. An exemplary implementation of a targeting system calculates a consumption rate of a particular word or token for a trade zone, by multiplying the number of times the content was consumed by the number of occurrences of a chosen token in the content. As an example, if the content is a webpage, the number of occurrences of a token is summed across all pages viewed by the trade zone to result in the consumption rate of the token by the trade zone 906. Additional statistics such as the count of unique consumers of a token in a trade zone, the count of unique content (for example number of unique pages) containing the token, and various statistics describing the distribution of each token and source content in a trade zone can be collected and used in a similar fashion.

According to one embodiment, collections of tokens are analyzed 913 to discover distinct or relative interests for each trade zone. The revealed interest data is mapped to custom trade zones to organize the interest level information in a way that can be used effectively for targeting. As an example, trade zones consuming more words associated with world cup soccer will index higher for that interest. The revealed interests or behaviors are mapped to targetable units (trade zones) and linked to targeting actions. In one embodiment, the data also indicates intensity for a given product or targeting objective by comparing the number of unique consumers of an interest in a trade zone to the volume of consumption.

According to one embodiment, collections of tokens are compared across time intervals to determine trends 914. In one embodiment, trends are determined by monitoring the frequency of tokens consumed over a time period, and can be an upward or a downward trend. Aggregation occurs at various time intervals to reveal microlevel and macrolevel trends. Once discovered 914, trends are mapped to trade zones 913 to be used as a targeting configuration for campaigns 915 or used to discover new SEM (search engine marketing) keywords for clients 907.

According to one embodiment, interests are matched to current and potential campaigns to optimize performance. One embodiment uses tokens that describe a particular campaign's objective 909. The tokens act as the seed 910 to discover which trade zones are more interested in the campaign's objective. As an example, only trade zones with a high interest in environmentally friendly products surrounding a particular store will be matched to an ad campaign for that store highlighting green products on sale. Another approach is to use a client's SEM keywords 908 as the seed for interest discovery. As an example, a department store campaign might optimize on terms such as fashion and various high-end designers. Trade zones that have a higher interest in fashion and these designers will be matched to the department store ad campaign, rather than advertising to all areas around the store.

According to one embodiment, linear and nonlinear classification methods, supervised and unsupervised learning algorithms, neural networks and various multidimensional data mining techniques are used 913 to reveal trends and interests, without a seed token vector. These organic insights are mapped into new keywords and phrases that indicate interest in a product 907. These insights are shared with existing and potential clients to enhance SEM 908 and/or improve campaign performance. Also, supplied and discovered tokens are expanded 910 using well-known token similarity algorithms. In one embodiment, discovered interests define virtual categories 907. For page content, virtual categories use tokens from successful impressions as a seed to compare future impression content. Scores from this process are used to optimize trade zone 915 and/or page selection 916, as one example.

According to one embodiment, tokenized data from web pages remains associated with pages. Term weighting schemes 911 are used to dynamically assign page scores 912 based on the discovered interests 907 or virtual categories, client SEM list 908, or campaign keywords 909. Rather than have pages scored by static categories, scoring criteria is optimized to achieve an individual campaign's objectives for all concurrent campaigns, regardless of commonality. These pages are then used as input to a campaign's targeting configuration 916.

A system for improving shape-based targeting by using interest level data has been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

We claim:

1. A computer-implemented method, comprising:
   creating one or more trade zones, wherein creating a trade zone comprises
   grouping a set of parameters to deliver custom shapes;
   clustering the custom shapes according to offline data, online data, and geographic distribution of IP addresses; and
   mapping clusters of the custom shapes to IP addresses;
   receiving data indicating consumption of a content source by one or more trade zones at a calculated rate;
   analyzing the calculated rate to determine an interest associated with each trade zone;
   selecting the one or more trade zones based upon a desired interest representative of a desired audience;
   transmitting a targeting request to the one or more selected trade zones including display instructions and information associated with a target action; and
   performing the target action.

2. The computer-implemented method of claim 1, wherein online data and offline data associated with the one or more trade zones are independent of cookies.

3. The computer-implemented method of claim 1, wherein the custom shapes are independent of geographic location.

4. The computer-implemented method of claim 1, wherein offline data comprises demographic data, point of sale data, and business information data.

5. The computer-implemented method of claim 1, wherein online data comprises page content, user clicks, advertisement impressions, and pages visited.

6. The computer-implemented method of claim 1, wherein offline data uses location information in the offline data to map to the custom shapes.

7. The computer-implemented method of claim 1, wherein online data uses IP addresses to map to the custom shapes.

8. The computer-implemented method of claim 1, wherein transmitting a targeting request to the one or more selected trade zones results in properly targeted actions, wherein properly targeted actions reach only the desired audience.

9. The computer-implemented method of claim 1, wherein a trend of an interest for a trade zone is calculated, wherein the trend is one of upward or downward.

10. The computer-implemented method of claim 1, wherein the content source is one of a webpage, a purchased server log, a mobile application, a television programming transcript, or an on-demand video selection.

11. The computer-implemented method of claim 1, wherein consumption of the content source comprises:

organizing one or more keywords according to the one or more trade zones, wherein the one or more trade zones consume the one or more keywords at a calculated rate.

12. The computer-implemented method of claim 11, wherein the calculated rate is determined by multiplying a first number of times that a content source was viewed by a second number of occurrences of a chosen keyword in the content source.

13. The computer-implemented method of claim 1, wherein consumption of the content source at a calculated rate comprises:
using a data mining technique to produce an output, wherein the output is mapped into one or more phrases having one or more words; and
organizing the one or more phrases according to the one or more trade zones.

14. The computer-implemented method of claim 13, wherein the calculated rate is determined by multiplying a first number of times a content source was viewed by a second number of occurrences of a chosen phrase in the content source.

15. The computer-implemented method of claim 13, wherein data mining techniques comprise linear and nonlinear classification methods, supervised and unsupervised learning algorithms and neural networks.

16. The computer-implemented method of claim 1, wherein creating a trade zone further comprises combining custom shapes that are too small to represent an IP range mapping based on consideration of one or more sets of parameters.

17. The computer-implemented method of claim 16, wherein consideration of one or more sets of parameters comprises geographic areas that best conform to the probable distribution of the IP address range, demographic homogeneity, natural geographic boundaries and types of IP address ranges.

18. The computer-implemented method of claim 16, wherein types of IP address ranges comprise business, residential and public locations.

19. The computer-implemented method of claim 1, wherein selecting one or more trade zones is further based on using probability to find a range of interests that related to a desired interest of a desired audience.

20. The computer-implemented method of claim 1, wherein transmitting a targeting request to the one or more selected trade zones further comprises transmitting simultaneously to similar trade zones based on one or more sets of parameters.

21. The computer-implemented method of claim 1, transmitting a targeting request to the one or more selected trade zones further comprises using a selection process to select the best target action.

22. The computer-implemented method of claim 21, wherein the selection process comprises weighted, random and sequential processes.

23. The computer-implemented method of claim 1, further comprising optimizing the targeting request based upon performance metrics collected when performing the target action.

24. The computer-implemented method of claim 23, wherein performance metrics comprise click-through rates, coupon downloads, impressions delivered, price per impression, lead submissions, landing page arrivals, product queries and product purchases.

25. The computer-implemented method of claim 1, wherein information associated with a target action comprises a weighted score dynamically assigned to each content source based upon one or more desired interests.

26. The computer-implemented method of claim 1, wherein creating a trade zone further comprises assigning one or more secondary custom shapes based on census tracts that are in close proximity to the clusters of custom shapes.

27. The computer-implemented method of claim 1, wherein performing the target action occurs independent of keywords and a prior online presence of the desired audience.

28. The computer-implemented method of claim 1, further comprising: determining whether multiple target items match the one or more selected trade zones; and
determining a best fit target item of the multiple target items.

29. The computer-implemented method of claim 9, further comprising
mapping the trend to the one or more trade zones to use as a targeting configuration for campaigns.

30. The computer-implemented method of claim 9, further comprising
discovering new search engine marketing keywords using the trend.

31. The computer-implemented method of claim 1, further comprising
using keywords for interest discovery.

32. A system, comprising:
a server, hosting a first webpage, in communication with a network, wherein a client system accesses the first webpage via the network; and
a targeting system in communication with the network, wherein the targeting system creates one or more trade zones by
grouping a set of parameters to deliver custom shapes;
clustering the custom shapes according to offline data, online data, and geographic distribution of IP addresses; and
mapping clusters of the custom shapes to IP addresses;
receives data indicating consumption of a content source by one or more trade zones at a calculated rate;
analyzes the calculated rate to determine an interest associated with each trade zone;
selects the one or more trade zones based upon a desired interest representative of a desired audience;
transmits a targeting request to the one or more selected trade zones including display instructions and information associated with a target action; and
performs the target action.

33. The system of claim 32, wherein online data and offline data associated with the one or more trade zones are independent of cookies.

34. The system of claim 32, wherein the custom shapes are independent of geographic location.

35. The system of claim 32, wherein offline data comprises demographic data, point of sale data, and business information data.

36. The system of claim 32, wherein online data comprises page content, user clicks, advertisement impressions, and pages visited.

37. The system of claim 32, wherein offline data uses location information in the offline data to map to the custom shapes.

38. The system of claim 32, wherein online data uses IP addresses to map to the custom shapes.

39. The system of claim 32, wherein transmitting a targeting request to the one or more selected trade zones results in properly targeted advertisement impressions, wherein properly targeted advertisement impressions reach only the desired audience.

40. The system of claim 32, wherein a trend of an interest for a trade zone is calculated, wherein the trend is one of upward or downward.

41. The system of claim 32, wherein the content source is one of a second webpage, a purchased server log, a mobile application, a television programming transcript, or an on-demand video selection.

42. The system of claim 32, wherein consumption of the content source comprises:
organizing one or more keywords according to the one or more trade zones, wherein the one or more trade zones consume the one or more keywords at a calculated rate.

43. The system of claim 42, wherein the calculated rate is determined by multiplying a first number of times that a content source was viewed by a second number of occurrences of a chosen keyword in the content source.

44. The system of claim 32, wherein
the targeting system uses a data mining technique to produce an output, maps the output into one or more phrases comprising one or more words; and organizes the one or more phrases according to the one or more trade zones.

45. The system of claim 44, wherein the calculated rate is determined by the targeting system that multiplies a first number of times a content source was viewed by a second number of occurrences of a chosen phrase in the content source.

46. The system of claim 44, wherein data mining techniques comprise linear and nonlinear classification methods, supervised and unsupervised learning algorithms and neural networks.

47. The system of claim 32, wherein the targeting system further creates a trade zone by combining custom shapes that are too small to represent an IP range mapping based on consideration of one or more sets of parameters.

48. The system of claim 47, wherein the one or more sets of parameters comprise geographic areas that best conform to the probable distribution of the IP address range, demographic homogeneity, natural geographic boundaries and types of IP address ranges.

49. The system of claim 48, wherein types of IP address ranges comprise business, residential and public locations.

50. The system of claim 32, wherein the targeting system selects one or more trade zones by using probability to find a range of interests that are similar to a desired interest of a desired audience.

51. The system of claim 32, wherein the targeting system transmits a targeting request to the one or more selected trade zones and transmits the targeting request to similar trade zones based on one or more sets of parameters.

52. The system of claim 32, wherein the targeting system transmits a targeting request to the one or more selected trade zones and uses a selection process to select the best target action.

53. The system of claim 52, wherein the selection process comprises weighted, random and sequential processes.

54. The system of claim 32, wherein the targeting system further comprises optimizing the targeting request based upon performance metrics collected when performing the target action.

55. The system of claim 54, wherein performance metrics comprise click-through rates, coupon downloads, impressions delivered, price per impression, lead submissions, landing page arrivals, product queries and product purchases.

56. The system of claim 32, wherein information associated with a target action comprises a weighted score dynamically assigned to each content source based upon one or more desired interests.

57. The system of claim 32, wherein the targeting system assigns one or more secondary custom shapes based on census tracts that are in close proximity to the clusters of custom shapes.

58. The system of claim 32, further comprising a real-time bidding system and a plurality of real-time bidders in communication with the network, wherein the targeting system acquires impressions from the real-time bidders for serving advertisements.

59. The system of claim 32, further comprising a publisher site in communication with the network, wherein the publisher site uses the targeting system to perform target actions for the publisher site's audiences.

60. The system of claim 32, wherein a target action is one of serving content, serving video, serving a page view, serving an advertisement, or serving a game.

61. The system of claim 32, wherein the target action occurs independent of page keywords and a prior online presence of the desired audience.

62. The system of claim 32, wherein the targeting system determines whether multiple target items match the one or more selected trade zones; determines a best fit target item of the multiple target items.

63. The system of claim 41, wherein the targeting system maps the trend to the one or more trade zones to use as a targeting configuration for campaigns.

64. The system of claim 41, wherein the targeting system discovers new search engine marketing keywords using the trend.

65. The system of claim 32, wherein keywords are used for interest discovery.

* * * * *